United States Patent
Guillemin et al.

(10) Patent No.: US 6,556,114 B1
(45) Date of Patent: Apr. 29, 2003

(54) ELECTROMAGNETIC ACTUATOR EQUIPPED WITH MEANS FOR ADJUSTING ITS MOBILE POLAR ELEMENT

(75) Inventors: Pierre Guillemin, Chabeuil (FR); Pierre Giroud, Bourg les Valence (FR)

(73) Assignee: Thales Avionics S.A., Velizy Villacoublay (FR)

( * ) Notice: Subject to any disclaimer, the term of this patent is extended or adjusted under 35 U.S.C. 154(b) by 0 days.

(21) Appl. No.: 09/857,212

(22) PCT Filed: Dec. 21, 1999

(86) PCT No.: PCT/FR99/03238

§ 371 (c)(1),
(2), (4) Date: Jun. 21, 2001

(87) PCT Pub. No.: WO00/41189

PCT Pub. Date: Jul. 13, 2000

(30) Foreign Application Priority Data

Dec. 30, 1998 (FR) .............................................. 98 16659

(51) Int. Cl.[7] .................................................. H01F 7/00
(52) U.S. Cl. ........................................ 335/229; 335/258
(58) Field of Search ................................ 355/78–86, 222, 355/220, 228–9, 230, 234, 236–7, 244, 258, 274; 200/61.45 M, 61.53

(56) References Cited

U.S. PATENT DOCUMENTS

| 4,933,515 | A | * | 6/1990 | Behr et al. ............... 200/61.53 |
| 5,153,472 | A | | 10/1992 | Karidis et al. |
| 5,202,658 | A | | 4/1993 | Evereet et al. |
| 6,076,403 | A | | 6/2000 | Giroud et al. |
| 6,089,093 | A | | 7/2000 | Lefort et al. |

FOREIGN PATENT DOCUMENTS

| EP | 0 110 431 | 6/1984 |
| EP | 0 258 569 | 3/1988 |
| EP | 0 441 737 | 8/1991 |
| FR | 27 37 610 | 2/1997 |
| FR | 2 776 064 | 9/1999 |
| FR | 2 784 745 | 4/2000 |
| WO | WO 97/05463 | 2/1997 |
| WO | WO 99/46565 | 9/1999 |
| WO | WO 00/23778 | 4/2000 |

OTHER PUBLICATIONS

Patent Abstracts of Japan, JP 57–166526, Oct. 14, 1982.

* cited by examiner

*Primary Examiner*—Lincoln Donovan
(74) *Attorney, Agent, or Firm*—Oblon, Spivak, McClelland, Maier & Neustadt, P.C.

(57) ABSTRACT

An electromagnetic accelerometer including a stationary stator element (12) associated with a movable polar element (14) securable to an external member (2), the stationary stator element (12) and the movable polar element (14) forming a magnetic circuit and defining between them at least two gaps (51), a magnet (5) helping to create magnetic field lines in the magnetic circuit, a coil (6) and a mechanism for energizing the coil for controlling the displacement of the movable polar element (14) through electromagnetic induction phenomena. The electromagnetic accelerometer further includes an adjustment polar element (15) for placing the movable polar element (14) in an adjusted position with respect to that of the stationary stator element (12), by deviating the magnetic field lines.

11 Claims, 5 Drawing Sheets

ELECTROMAGNETIC ACTUATOR EQUIPPED WITH MEANS FOR ADJUSTING ITS MOBILE POLAR ELEMENT

BACKGROUND OF THE INVENTION

1. Field of the Invention

The field of the invention is that of electromagnetic actuators and in particular those forming part of accelerometers intended for geophone applications. Geophones allow very detailed analysis of the nature of the Earth's strata with a view to detecting any sources of oil. Excitation sources send mechanical waves into the ground and these act on the accelerometer, its response providing information about the nature of the Earth's strata encountered by the mechanical waves. In such an application the actuator operates with a travel of very small amplitude and must have very high accuracy.

2. Discussion of the Background

An electromagnetic actuator comprises a stationary stator element coupled to a magnet, a coil and a movable polar element. The actuator is intended to displace an external member secured to the movable polar element.

In an accelerometer, the movable external member is a movable mass coupled to a slaving system with means for detecting its position. The slaving system delivers a slaving current to the coil so as to compensate, through electromagnetic induction phenomena, for a displacement of the mass under the effect of external conditions, for example seismic movements.

The value of the acceleration experienced by the mass is deduced from the value of the slaving current flowing through the coil which is necessary to prevent the displacement of the mass.

The electromagnetic actuator can be employed in other applications in which it operates in a similar manner, for example, the external member to be displaced can be a valve needle which the movable polar element must displace from an initial position to a final, working position. Means for detecting the position of the needle or of the movable polar element are provided so as to control the supply to the coil through a slaving current which allows a displacement of the movable polar element through electromagnetic induction. In this application, very high accuracy in the displacements is also required.

FIG. 1 diagrammatically illustrates an exemplary accelerometer incorporating an electromagnetic actuator of known type.

The electromagnetic actuator referenced 10 comprises a stationary stator element 12 comprising a radially magnetized permanent magnet 5. The magnet 5 surrounds a coil 6 inside which there is a movable polar element 14 secured to a mass 2 to be displaced. The stationary stator element 12 and the movable polar element 14 define between them at least two gaps 51 and form a magnetic circuit. The magnet 5 creates magnetic field lines in the magnetic circuit across the gaps. In the example, the stationary stator element 12 is in the form of an enclosure represented as a cylinder of revolution and the magnet is represented as an annulus. In the accelerometer application, the mass 2 is suspended from a peripheral frame 3 by arms 80, 81. The peripheral frame 3 is fixed to the stationary stator element 12. A system 7 for slaving the position of the mass 2 to be displaced and hence the position of the movable polar element 14 generates a slaving current in the coil 6 as long as the mass to be displaced is not in a reference position. This slaving system has the effect of preventing any displacement of the mass 2 under the effect of external conditions, for example seismic movements. More precisely, the slaving system 7 comprises means 82, 83 for detecting the position of the movable mass 2 and hence of the movable polar element 14 and means 70 for causing a slaving current to flow through the coil 6 when the mass leaves a so-called reference position, in such a way as to displace the movable polar element 14 through electromagnetic induction phenomena until the mass 2 reverts to its reference position. The movable polar element 12 compensates for the displacement which the mass 2 undergoes under the effect of the external conditions.

The value of the displacement which the movable mass 2 would have undergone, under the effect of the external conditions, is deduced from the value of the slaving current required to prevent the displacement of the movable mass 2.

In the electromagnetic accelerometer application, the means for detecting the position of the mass may be piezoelectric strain gauges 82, 83 placed on the arms 80, 81 for suspending the mass 2.

When the supply to the coil 6 is off, the movable polar element 14 is subject to various magnetic fields represented by arrows in FIG. 1. These arrows relate to the magnetic fields created by the permanent magnet 5. The polar element 14 is in unstable equilibrium and tends to move along an axis YY' perpendicular to the mid plane of the magnet 5 and leaves a middle position represented by the axis AA' and thereby displaces the movable mass 2. In this middle position, the movable polar element 14 is placed symmetrically with respect to the permanent magnet 5.

When the slaving system 7 comes into play and a slaving current flows through the coil 6, it creates a compensating magnetic field (not represented) which tends to return the movable polar element 14 to the mid plane AA' and hence to return the movable mass 2 to its reference position.

SUMMARY OF THE INVENTION

Given the great sensitivity demanded of such accelerometers, which have to detect very small accelerations, the components of the actuator must be perfectly dimensioned and also positioned with respect to the mass, to the peripheral frame and to the strain gauges before commencing a series of measurements.

It is desired that, when the accelerometer is switched on, in the absence of motion, the mass 2 should be in its reference position, this corresponding to a strainfree state for the piezoelectric strain gauges 82, 83. This state corresponds to an "electrical zero". This condition implies that the base of the stationary stator element 12, which is secured to the peripheral frame 3, and the face of the non-magnetic element which is fixed to the mass 2 should be in one and the same plane to within around a micrometer. This non-magnetic element forms the interface between the movable polar element 14 and the mass 2 since the movable polar element 14 is generally not connected directly to the mass 2. This positioning between the stationary stator element 12 and the non-magnetic element corresponds to a "mechanical zero". This condition also implies that the movable polar element 14 be in a position of "magnetic zero". In this position the vector sum of the forces applied to the movable polar element 14 is zero. If the components of the actuator had ideal dimensions, the magnetic field lines in the actuator would be distributed in a substantially equal manner between the two gaps 51.

In point of fact, the succession of dimensions involved in the construction of the components of the actuator can only ensure an accuracy of 10 micrometers if one wishes to avoid an unintended increase in the cost of construction of these components. It is then appreciated that, even if the components of the actuator are assembled with care, on turning on the accelerometer, in the absence of motion, the mass 2 is not in the "electrical zero" position and that the actuator is not in the "mechanical zero" position even if the movable polar element 14 is in the "magnetic zero" position. The quality of the measurements performed suffers.

To overcome the problems of dimensioning the components of the actuator and to facilitate their mounting and their positioning, the present invention proposes that a polar element for adjusting the position of the movable polar element with respect to that of the stationary stator element be included in the actuator. An adjustment can then be performed before the electromagnetic actuator is operated.

More precisely, the subject of the invention is an electromagnetic actuator intended to displace an external member, comprising a stationary stator element associated with a movable polar element securable to the external member, the stationary stator element and the movable polar element forming a magnetic circuit and defining between them at least two gaps, a magnet helping to create magnetic field lines in the magnetic circuit, a coil for controlling the displacement of the movable polar element through electromagnetic induction phenomena, characterized in that it furthermore comprises an adjustment polar element which cooperates with the stationary stator element so as to place the movable polar element in an adjusted position with tespect to that of the stationary stator element, by deviating the magnetic field lines.

The adjustment polar element is engageable in an opening of the stationary stator element, the insertion of the adjustment polar element causing a displacement of the movable polar element from a given initial position to the desired adjusted position detected by a position sensor, the movable polar element being closer to the opening in the initial position than in the adjusted position.

The adjustment polar element will preferably be given the form of a plug.

In order to keep the adjustment polar element in place after the adjustment, it can comprise a longitudinally striated portion which cooperates with the opening whose edge is smooth.

In order to manipulate the adjustment polar element in a relatively easy manner, the striated portion can be followed by a conical portion, itself followed by an active portion which enters the first through the opening, the active portion being of smaller diameter than that of the striated portion.

It will be possible to construct the adjustment polar element from a soft ferromagnetic material such as an iron-nickel alloy.

It will be possible to use a differential screw for the engagement of the adjustment polar element in the opening, it allows slow and steady insertion into the opening.

It is advantageous for the position sensor to detect the position of the external member secured to the movable polar element and hence to give the position of the movable polar element, it can be used during adjustment and also when the actuator is operating.

A system for slaving the position of the movable polar element is associated with the position sensor, this system providing the coil with a slaving current.

The invention also relates to an electromagnetic accelerometer comprising a movable mass suspended from a peripheral frame and associated with strain gauges, and which incorporates an abovementioned electromagnetic actuator and in which the external member is the movable mass and the position sensor the strain gauges, the stationary stator polar element being fixed to the peripheral frame.

In the adjusted position of the movable polar element, the movable mass and the peripheral frame are in substantially the same plane.

The present invention also relates to a process for adjusting the position of a movable polar element of an electromagnetic actuator, the electromagnetic actuator comprising a stationary stator element associated with the movable polar element, the stationary stator element and the movable polar element forming a magnetic circuit and defining between them at least two gaps, a magnet helping to create magnetic field lines in the magnetic circuit, a coil for controlling the displacement of the movable polar element through electromagnetic induction phenomena, characterized in that it comprises the following steps:

placement of the movable polar element in an initial position with respect to the stationary stator element, orientation of the electromagnetic actuator in such a way that a displacement of the movable polar element can occur substantially perpendicularly to gravity, engagement into an opening of the stationary stator element of a polar element for adjusting the position of the movable polar element with respect to that of the stationary stator element, this engagement, by deviating the magnetic field lines, causing a displacement of the movable polar element until the movable polar element has reached the desired adjusted position, this position being detected by a position sensor, the movable polar element being, in the initial position, nearer to the opening than in the desired adjusted position.

BRIEF DESCRIPTION OF THE DRAWINGS

The invention will be better understood by virtue of the description, which will follow, given by way of nonlimiting example, and by virtue of the appended figures among which.

DESCRIPTION OF PREFERRED EMBODIMENTS

Figure 2A:
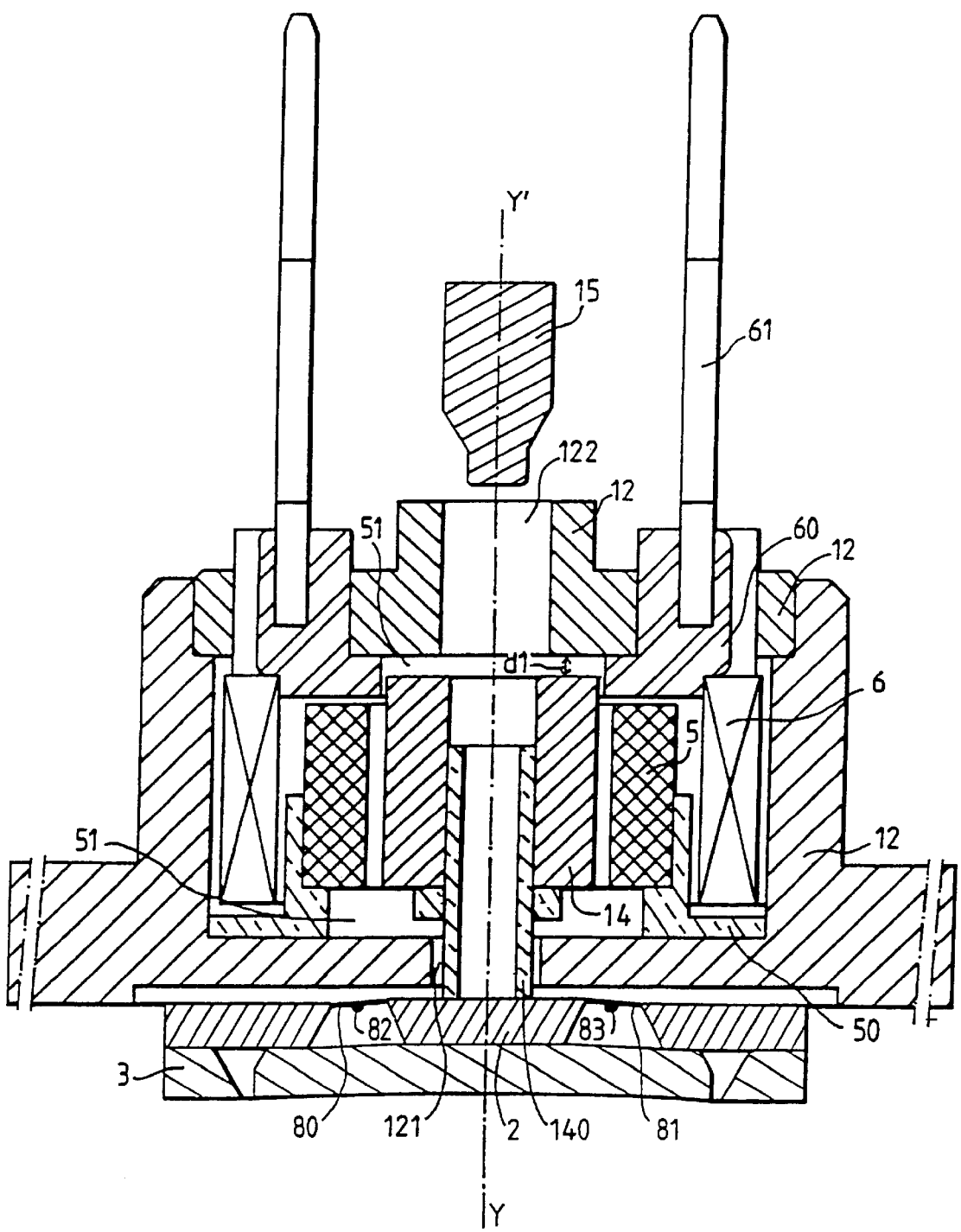
FIGS. 2a, 2b transverse sections of an exemplary accelerometer incorporating an electromagnetic actuator according to the invention in which the movable polar element is respectively in its initial position and in its desired adjusted position.
Figure 2B:
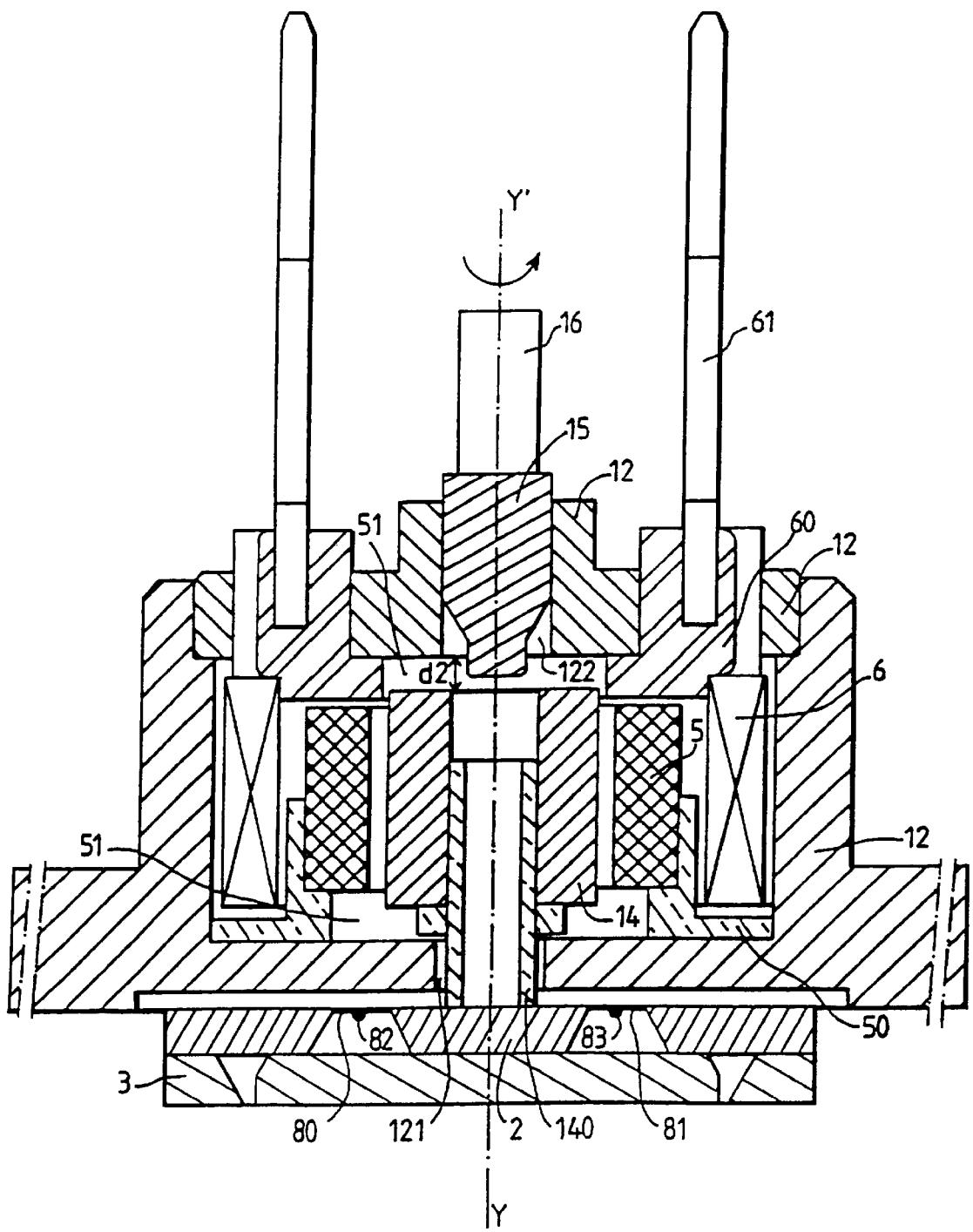
Figure 3:
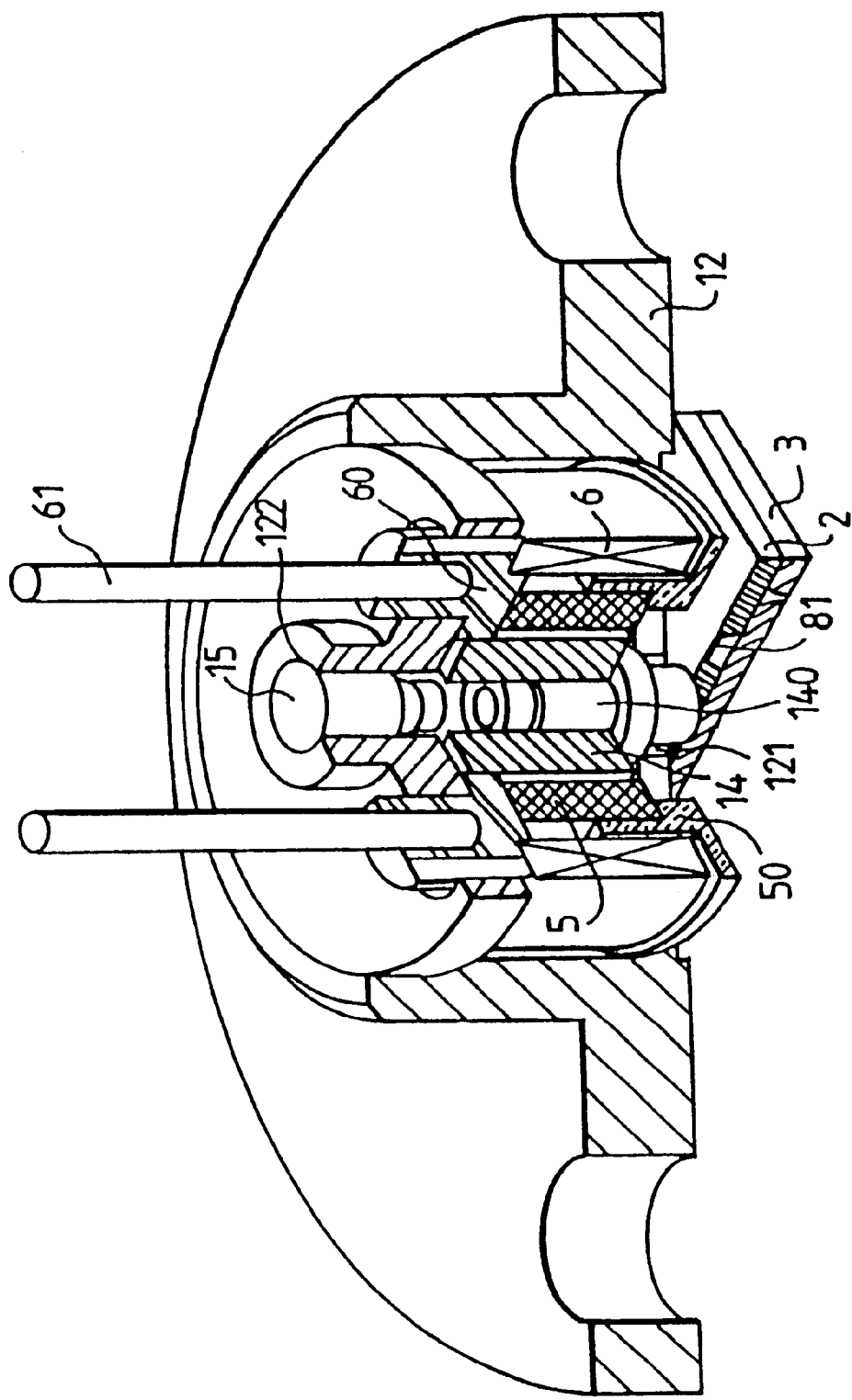
FIG. 3 is a three-dimensional view of an accelerometer according to the invention in which a sector has been removed.

FIGS. 2a, 2b show, in transverse section, an exemplary electromagnetic actuator according to the invention, respectively before and after adjustment of the position of its movable polar element. FIG. 3 is a three-dimensional view of the same actuator with a sector removed.

Figure 1:
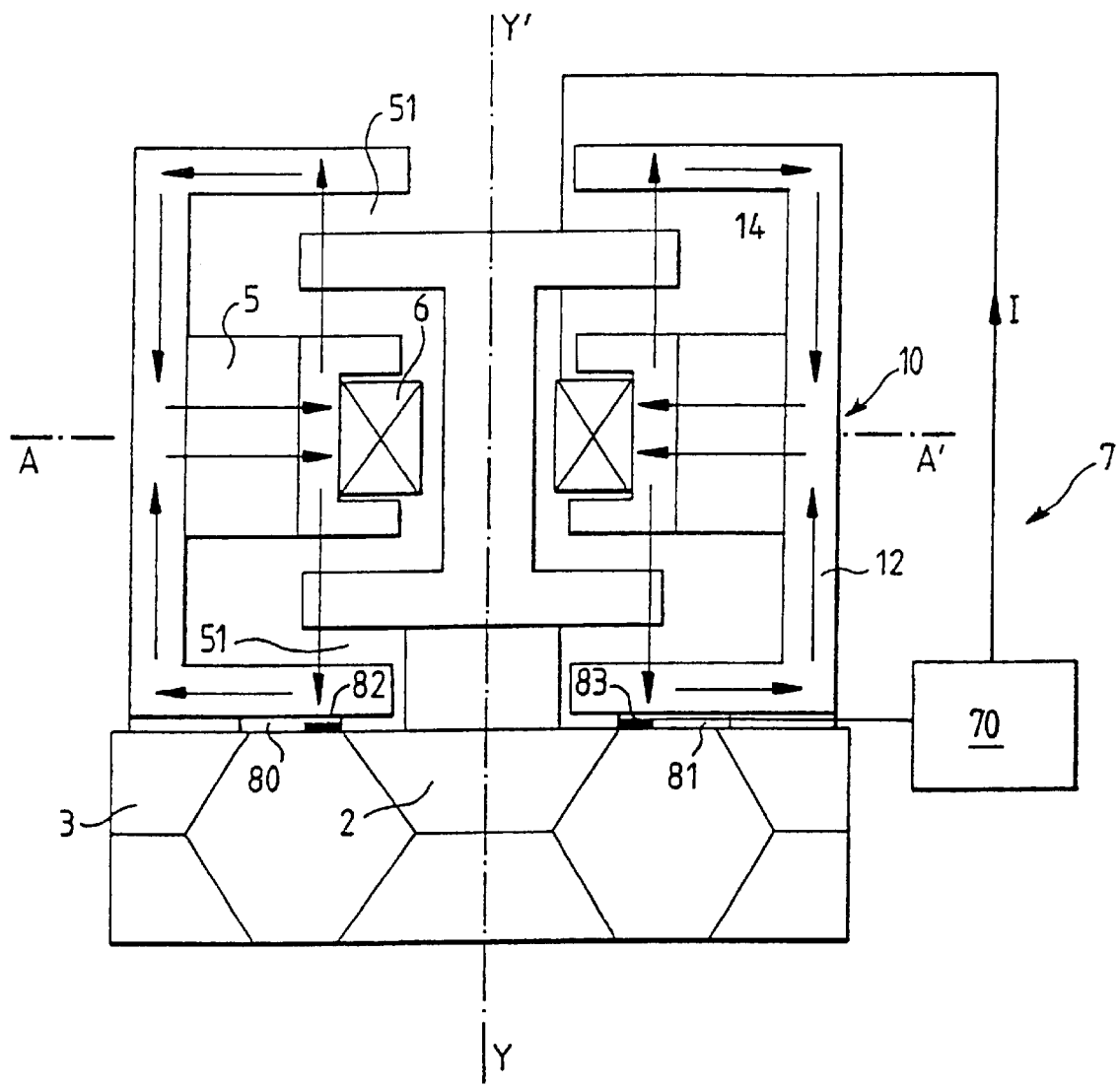
FIG. 1 (already described) diagrammatically illustrates an exemplary accelerometer incorporating an electromagnetic actuator of known type.

This actuator is similar to that of FIG. 1 which illustrates the prior art, but FIG. 2 are less diagrammatic. Seen therein are the stationary stator element 12, assembled to the peripheral frame 3 in the accelerometer application and coupled to the magnet 5, the coil 6 and the movable polar element 14 defining with the stationary stator element 12 at least two gaps 51. In this example, the stationary stator element 12 is in the form of an enclosure of revolution with axis YY', but other configurations are conceivable, in particular the stationary stator element could be flat. The coil 6 is held in the enclosure 12 by a non-magnetic chock 60. The coil is connected to contacts 61 so that it can be powered electrically. The slaving system is not represented completely as in FIG. 1, but the strain gauges 82, 83 are visible on the arms which hold the mass 2.

The annular permanent magnet 5 is placed, in the example, in the inside diameter of the coil 6. The reverse would be possible. The magnet 5 is held in the enclosure 12 with the aid of another non-magnetic chock 50.

The movable polar element 14, which is constructed as a component made of a soft magnetic material, is in the inside diameter of the magnet 5. It can move along the YY' axis. The gaps 51 are disposed on either side of the mid plane of the magnet 5, substantially perpendicularly to the axis YY'.

The stationary stator element 12 has two openings 121, 122 in planes substantially perpendicular to the axis YY'. The first 121 situated in the example at the base of the stationary stator element 12, on the peripheral frame 3 side, allows the movable polar element 14 to be fixed to the movable mass 2 by way of a non-magnetic intermediate component 140 which can be made of glass for example. One of the faces of this intermediate component 140 can be cemented to the movable mass 2 and the opposite face is fixed to the movable polar element 14. During the displacement of the movable mass 2, the intermediate component 140 moves in translation through the first opening 121.

The second opening 122 situated in the example at the top of the stationary stator element 12 allows the introduction of a polar element 15 for adjusting the position of the movable polar element 14 with respect to that of the stationary stator element 12. This adjustment polar element 15 is introduced into the magnetic circuit formed by the stationary stator element 12 and the movable polar element 14.

The introduction of the adjustment polar element 15 into the enclosure through the opening 122 has the effect of deviating the magnetic field lines, due in particular to the magnet 5 and established in the magnetic circuit on crossing the gaps 51.

The introduction of the adjustment polar element 15 therefore acts to displace the movable polar element 14 electromagnetically with respect to the stationary stator element 12.

In FIG. 2a, the actuator according to the invention associated with a mass 2 to be displaced is at a pre-adjustment stage. The electromagnetic actuator has been mounted, care having been taken to place its movable polar element 14 in an initial position at a distance dl from the second opening 122. The adjustment polar element 15 is not introduced into the second opening 122. In this initial position, the movable polar element 14 is closer to the second opening 122 than when it is in a desired adjusted position represented in FIG. 2b. When the movable polar element 14 is in this initial position, the mass 2 which it is intended to displace is not in its reference position and the strain gauges 82, 83 are under load.

The adjustment of the position of the movable polar element 14 with respect to that of the stationary stator element 12 can be performed by energizing the electromagnetic actuator and inserting the adjustment polar element 15 into the opening 122. The effect of these actions is to displace the movable polar element 14 electromagnetically, distancing it from the opening 122. The insertion of the adjustment polar element 15 into the opening 122 is halted when the movable polar element 14 has reached the desired adjusted position, this position having been detected by the means for detecting its position 82, 83.

FIG. 2b illustrates the actuator according to the invention with its movable polar element 14 in its desired adjusted position. It is now situated at a distance d2 from the opening 122 for the adjustment polar element 15. The distance d2 is greater than the distance d1. In the accelerometer application described, when the movable polar element 14 is in the desired adjusted position, the position of the mass 2 corresponds to an "electrical zero", the movable polar element 14 is in a "mechanical zero" position with respect to the stationary stator element 12 and in the "magnetic zero" position whatever the tolerances of the components making up the actuator. The adjustment polar element 15 helps to ensure that the movable polar element 14 is in its "magnetic zero" position.

In FIG. 3, the actuator according to the invention, given as an example, is seen in three dimensions and a sector has been removed, thereby revealing the movable polar element 14, the coil 6, the magnet 5 and the adjustment polar element 15 inside the stationary stator element 12 forming an enclosure. The adjustment polar element 15 is in the form of a plug. It is assumed that the adjustment has just been carried out and that the movable polar element is in the desired adjusted position.

Preferably the opening 122 for the adjustment polar element 15 has smooth walls and the adjustment polar element 15 comprises a longitudinally striated portion 15.1.

Figure 4A:
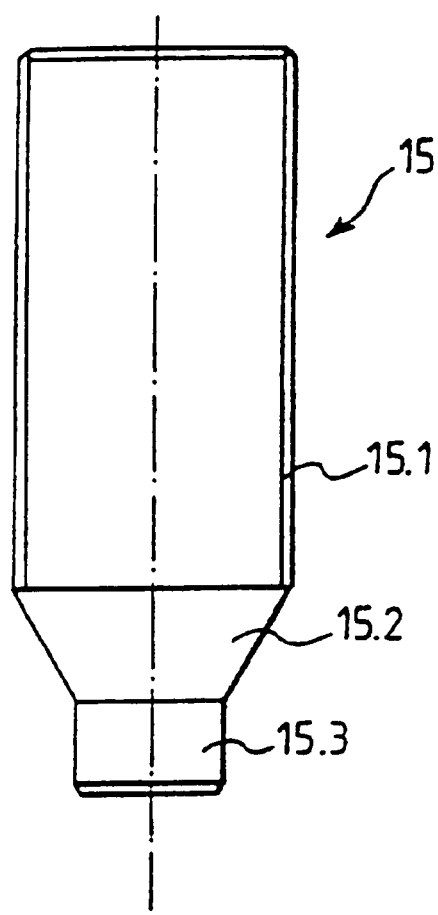
FIGS. 4a, 4b longitudinal and transverse sectional views of a polar element for adjusting the position of a movable polar element of an electromagnetic actuator according to the invention.
Figure 4B:
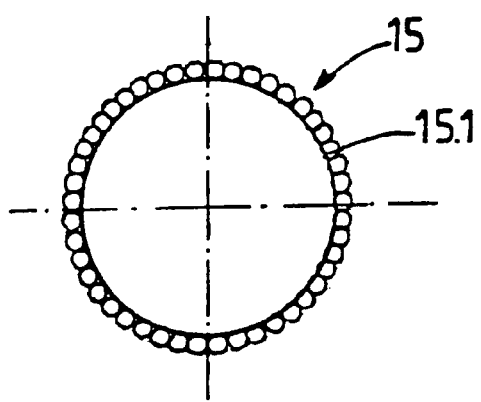

The diameter of the plug 15 at the bottom of the striations is substantially the same as that of the opening 122. During the insertion of the plug 15 into the opening 122 a certain resistance occurs and this resistance makes it possible in particular to keep the plug in place after the adjustment. The dimensions of such actuators do not exceed ten cubic centimeters and these dimensions require an adjustment polar element 15 with a magnetically active part which penetrates through the opening 122 which has a diameter of less than one millimeter and a length of the order of one millimeter. So that this plug can be manipulated relatively easily and so that it possesses satisfactory mechanical strength during insertion, this plug will be configured with several consecutive portions 15.1, 15.2, 15.3, including the striated portion 15.1 on one side, the magnetically active portion 15.3, of smaller diameter, on the other, and between the two portions a conical portion 15.2. FIGS. 4a, 4b illustrate such a plug.

To facilitate the insertion of the plug 15 into the opening 122 it will be possible to use a differential screw 16, causing a translation of the plug 15 of the order of a few micrometers per turn, typically 5 micrometers per turn. A soft ferromagnetic material such as an iron nickel alloy, in particular that known as Supranhuster 50 from the Imphy SA company, may be chosen for the adjustment polar element 15.

When searching for the adjusted position of the movable polar element 14 leading, in the example of the accelerometer, to the reference "electrical zero" position of the movable mass 2, it is preferable merely to have to insert the adjustment polar element 15 into the enclosure 12 and not to have to extract it therefrom, since extraction is mechanically more difficult given the dimensions involved. This is why, when assembling the movable polar element 14, it is placed in the enclosure 12 in the core of the magnet 5, nearer to the opening 122 for the tuning polar element 15 than when it has reached it adjusted position. This position corresponds to the initial position before adjustment of its position.

In the accelerometer application, when the movable polar element 14 is in its adjusted position, the intermediate element 140 providing the link between the movable polar element 14 and the mass 2 has its face connected to the mass 2 in the same plane as the external face of the stationary stator element 12 which possesses the first opening 121. The accelerometer is ready to operate and the actuator can then be used in a working mode.

The present invention also relates to a process for adjusting the position of the movable polar element of an electromagnetic actuator with respect to that of its stationary stator element.

The following is carried out. The movable polar element is given an initial position with respect to that of the stationary stator element and in this initial position it is closer to the opening for the adjustment polar element than in the desired adjusted position. In the accelerometer application, it is secured to the mass to be displaced and the stationary stator element is fixed to the peripheral frame. The mass must not be loaded from outside during adjustment. Obviously, this is a non-working mode.

The electromagnetic actuator is oriented in such a way that the displacement of the movable polar element can occur substantially perpendicularly to gravity. The electromagnetic actuator is switched on.

The adjustment polar element is engaged in the opening of the stationary stator element. This engagement is effected until the movable polar element reaches the desired adjusted position, this position being detected by the position sensor. In the initial position, the movable polar element is nearer to the opening than in the desired final position. The travel of the movable polar element is greater than 0 micrometers and less than 20 micrometers.

In the accelerometer application, since the position sensor forms part of the slaving system, the adjustment is effected in combination with the slaving.

After such an adjustment of the position of the movable polar element, the electromagnetic actuator is capable of operating with the high accuracy required. The construction of the components of a known actuator and their mounting even with the greatest possible care and hence at high cost cannot ensure such adjustment of the positioning of the movable polar element with respect to the stationary stator element. This positioning is effected almost to within one microcrometer and it is impossible to achieve this when being mindful of the sides of the components and their respective positioning.

What is claimed is:

1. Electromagnetic accelerometer comprising a movable mass suspended from a peripheral frame, an electromagnetic actuator configured to compensate for displacements of the movable mass with respect to a reference position, the actuator comprising a stationary stator element associated with a movable polar element securable to the movable mass, the stationary stator element and the movable polar element forming a magnetic circuit and defining between them at least two gaps, a magnet helping to create magnetic field lines in the magnetic circuit, a coil for controlling the displacement of the movable polar element through electromagnetic induction phenomena, a position sensor detecting a position of the movable mass secured to the movable polar element, an adjustment polar element which cooperates with the stationary stator element so as to place the movable polar element in an adjusted position with respect to that of the stationary stator element, by deviating the magnetic field lines, placing the movable mass, in the absence of motion of the accelerometer, in the reference position.

2. Electromagnetic accelerometer according to claim 1, wherein the position sensor comprises strain gauges, the reference position corresponding to a strain-free state in respect of the gauges.

3. Electromagnetic accelerometer according to claim 1, wherein the adjustment polar element is engageable in an opening of the stationary stator element, insertion of the adjustment polar element causing a displacement of the movable polar element from an initial position to a desired adjusted position detected by the strain gauges, the movable polar element being closer to the opening in the initial position than in the adjusted position.

4. Electromagnetic accelerometer according to claim 1, wherein the adjustment polar element has a form of a plug.

5. Electromagnetic accelerometer according to claim 3, wherein the adjustment polar element comprises a longitudinally striated portion which cooperates with the opening whose edge is smooth.

6. Electromagnetic accelerometer according to claim 5, wherein the striated portion is followed by a conical portion in turn followed by an active portion of smaller diameter than that of the striated portion.

7. Electromagnetic accelerometer according to claim 1, wherein the adjustment polar element is made from a soft ferromagnetic material.

8. Electromagnetic accelerometer according to claim 3, wherein the insertion of the adjustment polar element is carried out utilizing a differential screw.

9. Electromagnetic actuator according to claim 2, wherein the strain gauges are associated with a system for slaving the position of the movable polar element which provides the coil with a slaving current.

10. Electromagnetic accelerometer according to claim 9, wherein, in the desired adjusted position of the movable polar element, the movable mass and the peripheral frame are in substantially a same plane.

11. Process for adjusting a position of a movable polar element of an electromagnetic accelerometer, the movable polar element being securable to a movable mass, the accelerometer comprising a stationary stator element associated with the movable polar element, the stationary stator element and the movable polar element forming a magnetic circuit and defining between them at least two gaps, a magnet helping to create magnetic field lines in the magnetic circuit, a coil for controlling displacement of the movable polar element through electromagnetic induction phenomena, comprising the following steps:

placement of the movable polar element in an initial position with respect to the stationary stator element, orientation of the electromagnetic actuator such that a displacement of the movable polar element can occur substantially perpendicularly to gravity, engagement into an opening of the stationary stator element of a polar element for adjusting a position of the movable polar element with respect to that of the stationary stator element, the engagement, by deviating the magnetic field lines, causing a displacement of the movable polar element until the movable polar element has reached a desired adjusted position, the desired adjusted position being detected by the strain gauges, the movable polar element being, in the initial position, nearer to the opening than in the desired adjusted position.

* * * * *